UNITED STATES PATENT OFFICE.

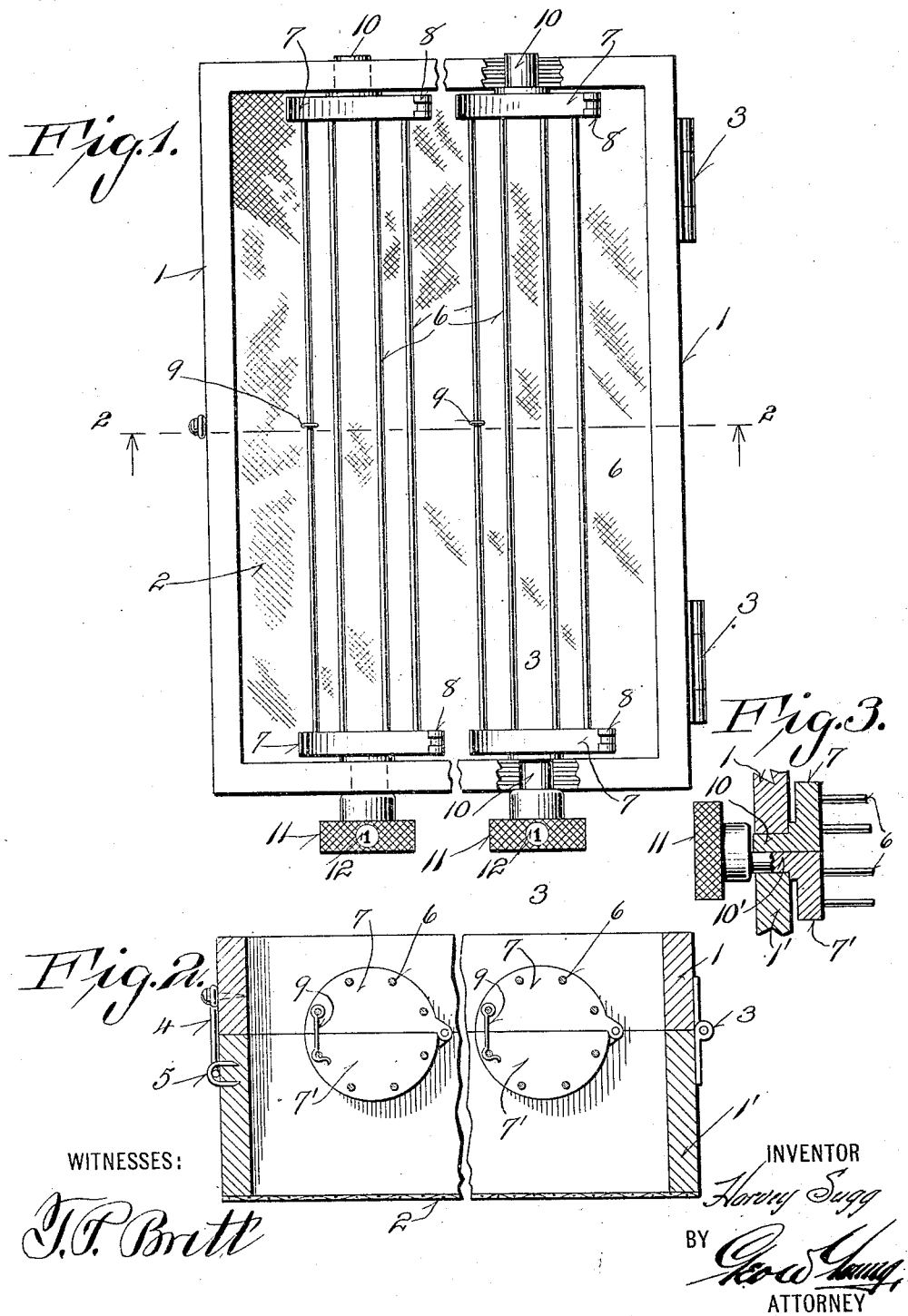

HARVEY SUGG, OF LADYSMITH, WISCONSIN.

INCUBATOR-TRAY.

1,283,594.  Specification of Letters Patent.  Patented Nov. 5, 1918.

Application filed June 28, 1918. Serial No. 242,366.

*To all whom it may concern:*

Be it known that I, HARVEY SUGG, a citizen of the United States, and resident of Ladysmith, in the county of Rusk and State of Wisconsin, have invented certain new and useful Improvements in Incubator-Trays; and I do hereby declare that the following is a full, clear, and exact description thereof.

My invention refers to incubator trays, its principal object being to provide racks for the tray and means whereby the racks containing eggs may be conveniently turned so that the eggs will be subjected to uniform heat.

With the above and other objects in view the invention consists in certain peculiarities of construction and combination of parts as set forth hereinafter with reference to the accompanying drawings and subsequently claimed.

In the drawings

Figure 1 is a top plan view, partly in section, of an incubator tray showing my invention;

Fig. 2 is a cross-section of the same on the line 2—2 of Fig. 1, and

Fig. 3 is a detail cross-sectional view of one end of the rack showing the mechanism for revolving the same, the section being taken on the line 3—3 of Fig. 1.

Referring by characters to the drawings, 1, 1', represent the upper and lower frame members, respectively, of an incubator tray, and 2 wire netting attached to the lower frame member 1', forming the bottom of the tray. The frame members are connected by hinges 3 at one side and the upper frame member 1 is provided with a hook 4 at the opposite side for engagement with a staple 5 in the lower frame member 1'.

Revolubly mounted on the lower frame member 1' are one or more egg-holders each being in the form of a rack or cage comprising any desirable number of wires 6 inserted in pairs of end-plates carried by opposite sides of the frame, each end-plate being composed of two sections 7 and 7', connected by a hinge 8. Attached to one of the wires of the upper section midway of its length is a hook 9 which engages with a wire of the lower section in order to lock the rack in its closed position. Thus it will be seen that the rack may be opened, eggs placed therein, and locked to prevent breakage of the eggs and to enable the operator to turn all the eggs at the same time, thus insuring a uniform heating of the eggs.

There are suitable apertures in the frame members 1 and 1', diametrically opposite each other, one-half of each aperture being cut in each frame member, said aperture acting as a bearing for the reception of extensions 10 and 10' of the end-plate sections 7 and 7', respectively.

Referring to Fig. 1, it will be noted that the construction of each end of the egg-holder is similar with the exception that the extension 10' at the operating side of the tray is lengthened, as shown in Fig. 3, and terminates at its outer end in a knurled head 11, which knurled head is provided with indices 12 at diametrically opposite points on its periphery to indicate to the operator whether or not the egg-holder has been turned. In this instance I have shown the numeral "1" and at the opposite point there would be the numeral "2," so that when the egg-holder is given a half turn the numeral "2" would be uppermost.

It will be apparent that any number of the egg-holders may be provided and that they may be of any desired length for use in either a square or oblong incubator. Also the racks may, if desired, be of wire netting or wooden slats in place of the wires shown.

In the operation of my device the tray is opened by disengagement of the hook 4 from the staple 5. Each egg-holder is then opened by releasing the hook 9 from engagement with the wire therebelow, and eggs inserted in each holder. The holders and tray are then closed, fastened, and inserted in an incubator. Heat is applied in the usual manner and when it is desirable to turn the eggs, it is only necessary to manipulate the knurled head 11. Thus it will be seen that turning of a great number of eggs can be accomplished in a few minutes, without danger of breakage, and that all the eggs are turned, avoiding the hatching of cripples due to neglect in turning some of the eggs.

It is apparent that locking means for the racks may be dispensed with in the construction shown as each section of the rack extends through the frame and thus, when the frame is closed, the racks are held in closed position.

While I have shown and described specific means for accomplishing the desired result, it is understood that I may vary the construction without departing from the spirit of my invention within the scope of the appended claims.

I claim:

1. In an incubator tray, upper and lower frame members, hinges connecting the frame members, means carried by the frame members for locking the same in closed position, one or more egg-holding racks revolubly mounted in the frame members, each rack comprising a pair of upper end-plates and a pair of lower end-plates, a hinge connecting the upper and lower end-plate of each pair, wires carried by each pair of end-plates, means carried by one wire of the upper series for locking the same to a wire of the lower series, and means carried by one end-plate of each rack for revolving the same.

2. In an incubator tray, upper and lower frame members, hinges connecting the frame members, means carried by the frame members for locking the same in closed position, one or more egg-holding racks revolubly mounted in the frame members, each rack comprising a pair of upper end-plates and a pair of lower end-plates, a hinge connecting the upper and lower end-plate of each pair, wires carried by each pair of end-plates, and means carried by one end-plate of each rack for revolving the same.

3. In an incubator tray, upper and lower frame members, hinges connecting the frame members, means carried by the frame members for locking the same in closed position, one or more egg-holding racks revolubly mounted in the frame members, each rack comprising a pair of upper end-plates and a pair of lower end-plates, one of the end-plates of each rack being extended and terminating in a knurled head, a hinge connecting the upper and lower end-plate, wires carried by the upper pair of end-plates, wires carried by the lower pair of end-plates, and means carried by one wire of the upper series for locking the same to a wire of the lower series.

4. In an incubator tray, upper and lower frame members apertured for the reception of egg-holding racks, hinges connecting the frame members, means carried by the frame members for locking the same in closed position, a series of egg-holding racks revolubly mounted in the apertured frame members each rack comprising a pair of upper end-plates and a pair of lower end-plates, one of the end-plates of each rack being extended and terminating in a knurled head, a hinge connecting the upper and lower end-plate at each end of the rack, wires carried by the upper pair of end-plates, wires carried by the lower pair of end-plates, and means carried by one wire of the upper series for locking the same to a wire of the lower series.

In testimony that I claim the foregoing I have hereunto set my hand at Ladysmith, in the county of Rusk and State of Wisconsin.

HARVEY SUGG.

Copies of this patent may be obtained for five cents each, by addressing the "Commissioner of Patents, Washington, D. C."